United States Patent [19]
Strieber

[11] Patent Number: 5,582,140
[45] Date of Patent: Dec. 10, 1996

[54] ROTATABLE TIMED MECHANISM FOR FEEDING VAPOROUS FLUID TO A COMBUSTION CYLINDER

[76] Inventor: Louis C. Strieber, 6800 W. Gate Blvd. #139B316, Austin, Tex. 78745

[21] Appl. No.: 434,570

[22] Filed: May 4, 1995

[51] Int. Cl.⁶ .................................................. F01L 7/06
[52] U.S. Cl. ............................. 123/80 D; 123/190.14
[58] Field of Search .................... 123/527, DIG. 12, 123/190.14, 190.2, 80 D

[56] References Cited

U.S. PATENT DOCUMENTS

| | | | |
|---|---|---|---|
| 2,327,470 | 8/1943 | Tjaarda | 123/41.4 |
| 2,648,318 | 8/1953 | Bensinger | 123/80 D |
| 4,738,233 | 4/1988 | Hitomi et al. | 123/190.2 |
| 5,105,784 | 4/1992 | Davis et al. | 123/190.2 |
| 5,201,299 | 4/1993 | Kong | 123/527 |
| 5,309,876 | 5/1994 | Schiattino | 123/190.2 |
| 5,437,252 | 8/1995 | Glover | 123/190.2 |

Primary Examiner—Erick R. Solis

[57] ABSTRACT

A timeable fluid feed mechanism for feeding or injecting combustible vapors into an internal combustion engine, primarily compression ignition. The mechanism includes a rotating disk with a cavity that passes repeatedly and consecutively over a fuel inlet pipe, cylinder, piston crown, vent pipes, and then again over the fuel inlet pipe. Combustion occurs when fluid in the cavity is exposed to the cylinder and mixes with the other fluid in the cylinder. Timing is accomplished by the axially located driving shaft with angled splined gears meshing with angled splined gears in the disk. Axial movement of the shaft causes the disk and its fluid feed cavity to change position relative to the shaft, thereby changing timing. The features of a nonrotating axial motion input to the injector disk drive shaft, ease of operation, and a curved leading edge of the injector cavity improve combustion. Power input to the rotatable disk shaft is over a suitable length of the shaft to avoid moving the power input gears axially.

28 Claims, 2 Drawing Sheets

ROTATABLE TIMED MECHANISM FOR FEEDING VAPOROUS FLUID TO A COMBUSTION CYLINDER

BACKGROUND OF THE INVENTION

The present invention relates generally to exposing or feeding a vaporous fluid to a combustion cylinder, particularly to exposing or feeding a combustible vaporous fluid to a combustion cylinder, and specifically to a rotatable structure for such which is timed with the stroke of the piston.

Fluid for combustion is typically introduced into the combustion cylinder of an internal combustion engine through an intake valve. The combustion fluid is typically mixed with air prior to being introduced into the combustion cylinder and is generally in a gaseous state. Fluid injectors typically inject a combustion fluid in the mist form directly into the combustion cylinder where it is mixed with air for combustion.

SUMMARY OF THE INVENTION

A general object of the invention is to provide a unique fluid feed mechanism for feeding fluid to the combustion cylinder of an internal combustion engine.

Another object of the invention is to provide a fluid feed mechanism which is uniquely rotatable. Specifically, the mechanism includes a rotatable structure with a cavity formed therein. The cavity is communicable at variable times with a fluid outlet and with the combustion cylinder. The structure rotates such that the cavity is moved from the fluid outlet to the combustion cylinder. Fluid flows into the cavity as the cavity passes the fluid outlet. Such fluid then mixes with other fluid in the combustion cylinder as the cavity passes the combustion cylinder.

Another object of the invention is to provide such a fluid feed mechanism which is uniquely timed. The rotating structure includes timing means to advance or retard the location of the fluid filled cavity relative to the stroke of the piston. The timing means includes a central shaft engaged with an angled splined arrangement with the structure such that axial movement of the shaft rotates the structure relative to the shaft and thus advances or retards the location of the cavity relative to the stroke of the piston.

Another object of the invention is to provide such a fluid feed mechanism which is uniquely connected to the piston. Specifically, a mechanical train runs from the piston to the means for rotating the structure. Accordingly, it is ensured that the fluid is fed to the combustion cylinder at the proper time.

Another object of the invention is to provide a fluid feed mechanism which uniquely includes a rotating disk. The cavity extends from one of the flat faces of the disk.

Another object of the invention is to provide such a fluid feed mechanism which includes a unique cavity. Specifically, the cavity includes a leading edge tailored to be substantially equidistant to the edge of the combustion cylinder at one point during rotation of the structure such that fluid from the cavity mixes as quickly as possible with fluid from the cylinder.

Another object of the invention is to provide such a fluid feed mechanism which includes a unique means for purging the cavity of exhaust gases that may be present. Specifically, the cavity is purged after the cavity has finished communicating with the combustion cylinder, but prior to communication with the combustible inlet fluid line.

Another object of the invention is to provide a unique location for the rotatable structure. Specifically, the structure is-seated in the cylinder head of the engine. Such a location provides for efficient manufacture, operation, maintenance, repair, and modification.

Another object of the invention is to provide unique methods for feeding fluid to the combustion cylinder of an internal combustion engine.

Another object of the invention is to direct the combustion toward the center of the combustion cylinder.

Figure 1:
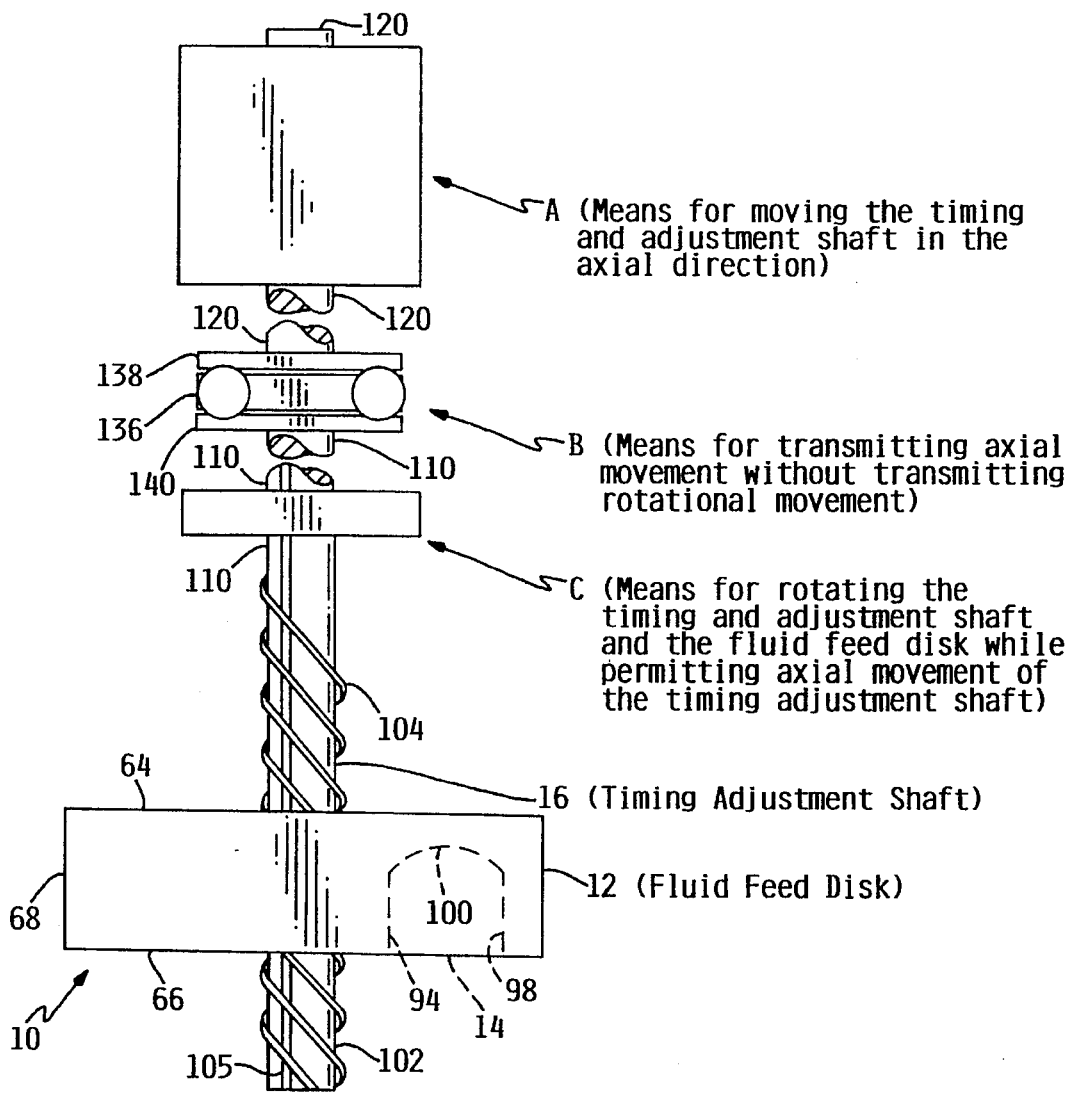
FIG. 1 shows a side, partially diagrammatic view of the present fluid feed mechanism.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "axial", "end", "upper", "lower", "radial", "inwardly", "side", "upright", "first", "second", "over", and similar terms are used herein, it should be understood that these terms have reference only to the structure shown in the drawings as it would appear to a person viewing the drawings and are utilized only to facilitate describing the preferred embodiment.

DETAILED DESCRIPTION

Figure 5:
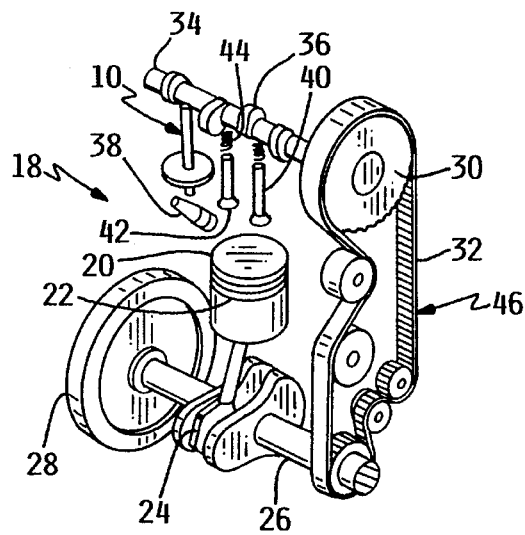
FIG. 5 shows a perspective, partially diagrammatic view of an internal combustion engine relative to the fluid feed mechanism.
Figure 6:
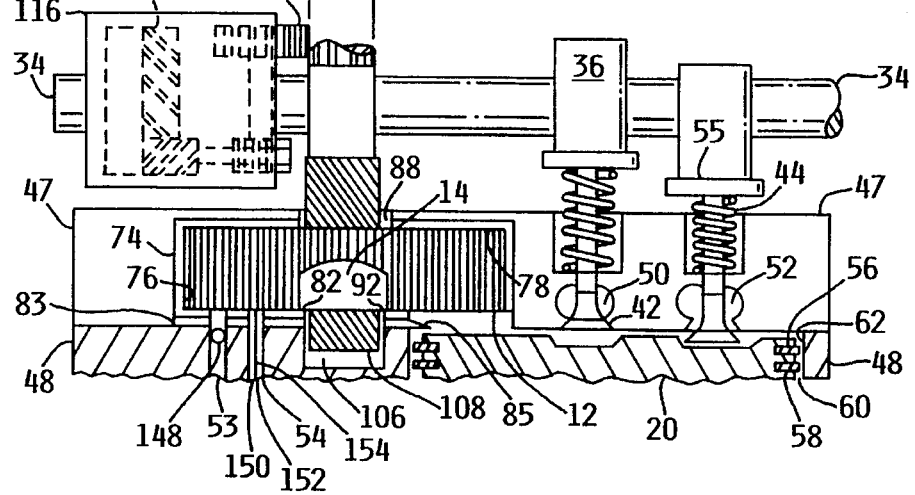
FIG. 6 shows a partially diagrammatic, side, partially section view of the fluid feed mechanism mounted relative to the head and block of an internal combustion engine, further shows the preferred embodiment for transmitting rotational power to the shaft of the disk of the fluid feed mechanism while permitting axial movement of the shaft, and further shows the preferred embodiment for transmitting axial movement to the shaft for timing the disk.

As shown in FIG. 1, the present fluid feed mechanism or rotatable timed mechanism for feeding fluid to a combustion cylinder is generally indicated by the reference numeral 10. The mechanism 10 includes a disk or rotatable structure 12 with a cavity 14, and a rotational power transmitting and timing adjustment shaft 16 engaged centrally with the disk 12. As shown in FIGS. 5 and 6, the mechanism 10 is preferably mounted in an internal combustion engine 18 having a piston 20, piston rings 22, a connecting rod 24, a crankshaft 26, a flywheel 28, a camshaft drive 30, a timing belt 32 engaging the crankshaft 26 and camshaft drive 30, a camshaft 34 with cams 36, a spark plug or ignition means or combustion means 38, and valve assemblies 40 with a poppet valve 42 and a valve spring 44. A mechanical train 46 includes the piston 20, connecting rod 24, crankshaft 26, timing belt 32, camshaft drive 30, and camshaft 34. As shown in FIG. 6, the internal combustion engine 18 further includes an engine head 47, an engine block 48, an intake fluid line 50 formed in the head 47, an exhaust line 52 formed in the head 47, fluid lines 53 and 54 formed in the block 48, rocker ends 55, a compression ring 56 on the piston 20, an oil scrapper ring 58 on the piston 20, and a combustion cylinder or combustion chamber 60 formed in the block 48 by a cylinder sidewall 62.

As shown in FIGS. 1–4, and 6, the disk 12 includes a pair of generally flat, parallel, axially spaced apart, upper and lower end surfaces or end walls 64 and 66, and a cylindrical side surface or sidewall 68. The disk 12 further includes a central opening 70 having angled splined grooves 72. The disk 12 is seated in a disk seat 74 formed in the engine head 47. The disk seat 74 includes a cylindrical seat side surface or sidewall 76 and a generally flat upper end surface or end wall 78 which is circular or disk like in shape. The end wall 78 may include oil grooves formed therein and extending radially relative to the shaft 16 and communicating with the upper surface 64 of the disk 12 for lubricating such. These oil grooves are spaced from the cylinder 60 at a distance greater than the breadth of the cavity 14. The disk 12 acts as an oil seal between these oil grooves and the combustion chamber. The disk seat 74 further includes a lower end surface or end wall 82. The lower end wall 82 of the disk seat 74 is circular or disk like in shape except for a cutout section having an edge 86 formed in the shape of an arc for being tailored to the cylindrical sidewall 62 of the combustion cylinder 60. The lower end wall 82 may include oil grooves formed therein and extending radially relative to the shaft 16 and communicating with the lower surface 66 of the disk 12 for lubricating such. The end walls 78 and 82 include openings 88 for permitting portions of the shaft 16 to extend therethrough. The lower end wall 82 further includes openings for the fluid lines 53 and 54. The disk seat 74 may be formed of a material harder than the engine head 47. The sidewall 76 of the disk seat 74 overlaps or intersects the combustion cylinder sidewall 62 as shown in FIGS. 2–4 and 6 such that the cavity 14 communicates with the combustion cylinder 60.

Figures 2, 3, 4:
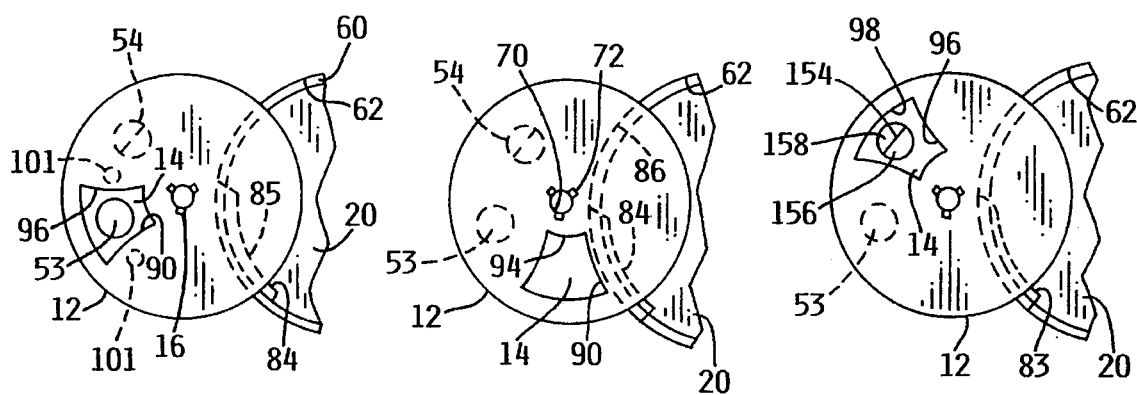
FIG. 2 shows an isolated, partially diagrammatic view of the fluid feed mechanism relative to a combustion cylinder and shows the fluid feed mechanism in position to accept fluid from a fluid outlet.
FIG. 3 shows an isolated, partially diagrammatic view of the fluid feed mechanism relative to a combustion cylinder and shows the fluid feed mechanism in position to feed the fluid into the combustion cylinder.
FIG. 4 shows an isolated, partially diagrammatic view of the fluid feed mechanism relative to a combustion cylinder and shows the fluid feed mechanism in position to purge exhaust gases from the cavity.

The disk seat 74 may be mounted on a hardened plate 83. The plate 83 may have generally the shape of a disk with the exception of a cut-out section where the plate 83 otherwise would overlap with the cylinder 60. The plate 83 does includes an integral lip 84 which partially overlaps with the cylinder 60 and extends to and partially over the piston 20. The lip 84 includes a beveled edge 85. The lip 84 extends over the cavity entrance zone into the cylinder 60 to reduce heat build-up and pressure on the rings 56 and 58 and cylinder wall 62 at the point of combustion which is preferably in the cavity 14. It should be noted that the lip 84 may extend along the entire edge 86 of the cut-out section of the disk seat 74. Edge 86 runs preferably in line with the cylinder wall 62. At one point during the rotation of the disk 12, as shown in FIG. 3 the leading edge 92 of the leading wall 90 of the cavity 14 is substantially equidistant from the beveled edge 85 which is also equidistant from the upper edge of the cylinder wall 60 to permit the fluid in the cavity 14 to quickly mix with fluid in the cylinder 60. The disk seat 74 and the plate 83 and its lip 84 may be considered as part of the combustion chamber since such is fixed relative to the disk 12. Further, the plate 83 may be considered to be part of the disk seat 74.

The cavity 14 extends inwardly and upwardly from the lower surface 66 of the disk 12. The cavity 14 includes a leading curved upright sidewall 90 having a lower curved leading edge 92 which may be tailored to be equidistant or substantially equidistant from the combustion cylinder sidewall 62 at one point during rotation of the disk 12, as shown in FIG. 3, to maximize the flow of fluid between the cavity 14 and the cylinder 60. At such a point, the arc of the edge 92 has an axis in common with the central longitudinal axis of the cylinder 60. The cavity 14 is further formed by an upright curved sidewall 94. The distance between each of the points on the lower edge of the sidewall 94 and the opening 70 is greater than the closest distance between the combustion cylinder sidewall 62 or disk seat edge 86 and the axis of the opening 70 to permit each portion of the cavity 14 to directly communicate with the combustion cylinder 60. The cavity 14 is further formed by an upright curved trailing end wall 96 with a lower edge tailored to be equidistant from the combustion cylinder sidewall 62 or disk seat edge 86 at one point during rotation of the disk 12 to maximize the size of the cavity 14 relative to the distance between the cylinder sidewall 62 or disk seat edge 86 and the outlet of the fluid line 54, the distance between the outlet of fluid line 54 and the outlet of fluid line 53, and the distance between the outlet of fluid line 53 and the cylindrical sidewall 62. Such distances are greater than the distances between corresponding points on the lower edges of leading wall 90 and trailing wall 96 such that fluid does not flow directly among the outlets and cylinder 60 but rather is conveyed among the outlets and the cylinder 60 by the cavity 14 of the disk 12. The cavity 14 is further formed by an upright outer curved sidewall 98 and a hemi-spherical ceiling 100. The hemi-spherical ceiling 100, as opposed to a flat ceiling, lends greater strength to the top of the disk and permits a cavity 14 of greater volume to be formed in the disk 12 and further permits a smoother flow and better mixing of combustible fluid.

The disk 12 further includes a pair of counter-balance weights 101 fixed or molded in the disk 12 near the walls 90, 96. The weights 101 compensate for cavity 14.

The power transmitting shaft 16 includes an angled splined arrangement portion 102 having angled splined gears 104 for engaging the grooves 72 such that axial movement of the shaft 16 rotates the disk 12 relative to the shaft portion 102. The shaft portion 72 includes axially extending oil grooves 105 milled into the shaft portion 102. The grooves 105 extend through the gears 104. The oil grooves 105 may further be milled on the shaft portion 110 and radially into the thrust bearing 136. Axial movement of the shaft portion 102 in one direction advances the location of the cavity 14 relative to the stroke of the piston 20 and in the other direction retards the location of the cavity 14 relative to the stroke of the piston 20. The engine block 48 includes a bore 106 for receiving an end 108 of the shaft portion 102 for permitting axial movement of the shaft portion 102. The bore 106 also extends through the upper and lower walls 78 and 82 of the disk seat 74 and through the engine head 47.

The shaft 16 further includes a power transmitting portion 110 preferably rigidly affixed or integral with the angled splined arrangement shaft portion 102. Preferably the power transmitting portion includes a plurality of axially and radially extending gear teeth 112 for engaging a gear 114 of a reduction gear box 116. The gear 114 is connected through a mechanical train such as a gear train in the gear box 116 to a gear 118 rigidly affixed to the cam 34. The gear box 116 through its arrangement of gears or mechanical train may vary the relative rates of rotation of the camshaft 34 and the toothed portion 110 of the shaft 16 to increase or decrease the rate of rotation of the toothed portion 110 relative to the camshaft 34. Gear 114 includes axially extending gear teeth running parallel to the elongate teeth 112 of shaft portion 110 such that the shaft portion 110 may move axially or slidingly along the gear 114 while still permitting the gear 114 to drive the toothed shaft portion 110. It can be appreciated that the gear box 116 forms part of the mechanical train 46. The housing of the gear box 116 may be rigidly affixed such as to the engine head 47.

The shaft 16 further includes a portion 120 for receiving the transmission of axial movement and for transmitting the axial movement to the shaft 16. Axial movement to shaft portion 120 is accomplished by a rotating gear 122 keyed to a hub 124 fixed, for example, relative to the engine head 47. The gear 122 may be hand driven or rotated by handle 126 fixed to the gear 122 radially relative to the hub 124, or the gear 122 may be driven by an electric motor driving the hub 124. The gear 122 includes straight axially and radially extending gear teeth 128 which engage a toothed rack 130 rigidly fixed on the shaft portion 120. The toothed rack 130 includes teeth 132 extending in a plurality of planes at right angles to the shaft portion 120. Rotation of the gear 122 drives the shaft portion 120 in the desired axial direction. Shaft portion 120 may slide axially and be supported relative to the engine 18 via a bushing 134 slidingly engaging the upper end of the shaft portion 120. The bushing 134 may be fixed, for example, relative to the engine head 47. The bushing 134 includes a slot 135 to permit reception of the toothed rack 130.

A thrust bearing 136 between the shaft portions 110 and 120 permits the transmission of axial movement to the shaft portion 110 while permitting rotational movement of the shaft portion 110. Or, in other words, the bearing 136 permits axial movement between the shaft portions 110, 120 without transmitting relative rotational movement therebetween. The bearing 136 is seen diagrammatically in FIG. 1 as having an upper race 138 rigidly affixed to the shaft portion 120 and a lower race 140 rigidly affixed to the shaft portion 110. As seen in FIG. 6, the shaft portion 120 includes an annular locking collar 142 and the shaft portion 110 includes an integral disk shaped head 144 rotatable in the collar 142. The lower end of the shaft portion 120 includes an annular clamp 146 for supporting the shaft portion 120 relative to the collar 142. If desired, the shaft portion 120 and locking collar 142 may be formed of two integral pieces later welded together or held together by clamp 146 along a seam line 147 for ready connection of head 144.

The fluid inlet line 53 includes adjacent its outlet a one way check valve 148. Valve 148 permits the fluid to be accurately pressurized in the cavity 14 and maintains the pressure in the cavity 14 when the cavity 14 is in communication with the fluid line 53. Along with the trailing wall 96, the valve 148 is also a barrier against fluid in line 53 igniting. Fluid introduced through line 53 preferably is hydrogen, propane, or butane. Hydrogen is most preferred.

The fluid line 54 includes two fluid line portions 150 and 152 separated by a divider or strip 154 running the length of the line 54. One of the line portions communicates with an inlet 156 formed in the disk seat floor 82 and the other line portion communicates with an outlet 158 formed in the disk seat floor. Air or other fluid such as an inert gas or even the combustible fluid which normally is pumped to the cavity 14 through line 53 may be forced through inlet 156 to in turn evacuate the cavity 14 or force or purge fluid, such as exhaust fluid, therefrom.

Now that the construction of the fluid feed mechanism according to the teachings of the preferred embodiment of the present invention has been set forth, subtle features and advantages of the preferred construction of the present invention can be appreciated. It can be appreciated that in operation, as the piston 20 moves through its intake, compression, power, and exhaust strokes, rotational movement is transmitted to the shaft 16 from the piston 20 by the mechanical train 46. The shaft 16 then drives the disk 12 to rotate. The engagement between the angled splined shaft portion 102 and the grooves 72 is sufficiently tight and precise to permit the shaft portion 102 to transmit rotation to the disk 12 without relative rotational slippage, yet the engagement permits axial movement of the shaft portion 102 relative to the disk 12 for timing purposes. As the disk 12 rotates, the cavity 14 rotates in one direction from the fluid inlet 53 to the cylinder 60 to the purging inlet and outlet 156 and 158 and back to the fluid inlet 53.

It can be appreciated that, as the cavity 14 passes over inlet 53, the cavity 14 is filled under pressure. Fluid may continually be fed to and through the valve or valve chamber 148. The fit between the disk 12 and the disk seat floor 82 is sufficiently precise to minimize fluid leakage therebetween. As the fluid filled cavity 14 is rotated to the cylinder 60, it may flow under pressure from the cavity 14 almost immediately as leading edge 92 passes over disk seat edge 86 adjacent to the cylinder sidewall 62. Or, more preferably, if the pressure of fluid such as air in the cylinder 60 is greater than pressure in the cavity 14, such fluid flows into the cavity 14 almost immediately as the leading edge 92 passes adjacent to the disk seat edge 86. The fluid thus mixes with other fluid such as the air which has been introduced through inlet 44, whereupon the fluid mixture in the cylinder 60 and cavity 14 is ignited by combustion means such as the spark plug 38 seen in FIG. 5 or, preferably, by compression ignition in diesel engines such as represented in FIG. 6. At combustion, combustion gases flow from the cavity 14, over the lip 85 toward the center of the cylinder 60. At the time of combustion, it is preferred that the leading edge 92 be located only a small distance, such as from 1° to 10° past the cylinder sidewall 62 or disk seat edge 86. However, if desired, combustion may occur after the cavity 14 is more completely in communication with the cylinder 60. As the disk 12 continues to rotate, the leading edge 92 of cavity 14 passes over the fluid inlet 156 and outlet 158 at the same time. Any exhaust gases in the cavity 14 are thereby forced therefrom. The cavity 14 is then rotated by the disk 12 back to the fluid inlet 53.

It can further be appreciated that the disk 12 may be timed relative to the stroke of the piston 20 or the time of ignition in the cylinder by operation of gear 122. Rotation of gear 122 imparts a linear motion to shaft portion 120 which in turn imparts a linear motion to shaft portion 110 which slides past gear 114 while still permitting the gear 114 to transmit rotational movement to the shaft portion 110. In turn, shaft portion 110 imparts a linear movement to shaft portion 102 to move the angled splined gears 104 linearly relative to the disk 12 to rotate the disk 12 relative to the shaft portion 102. Accordingly, the cavity 14 is advanced or retarded relative to the piston stroke for timing the ignition.

It can further be appreciated that the fluid introduced through line 53 is preferably in gaseous form.

It can still further be appreciated that combustible fluids such as hydrogen, propane, and butane are preferred. However, it can be appreciated that the fluid itself may not be combustible but may instead be an additive to facilitate the combustion of fluids in the cylinder 50 or function of the engine.

It can be further appreciated that the rack 130 may be of sufficient length to permit the cavity 14 to be advanced at least 90° and retarded at least 90°. More preferably, the rack 130 is shorter to be more compact but still of sufficient length to permit the cavity 14 to be advanced at least 45° and retarded at least 45°.

It can be further appreciated that the cavity advantageously includes only one opening to and from the cavity. The fluid enters and exits the cavity or pocket only through one opening. Such minimizes the surface area in contact with fluid, exhaust gases or combustion products and minimizes the force of expansion of combustion gases being directed through and around the disk.

Figure 7:
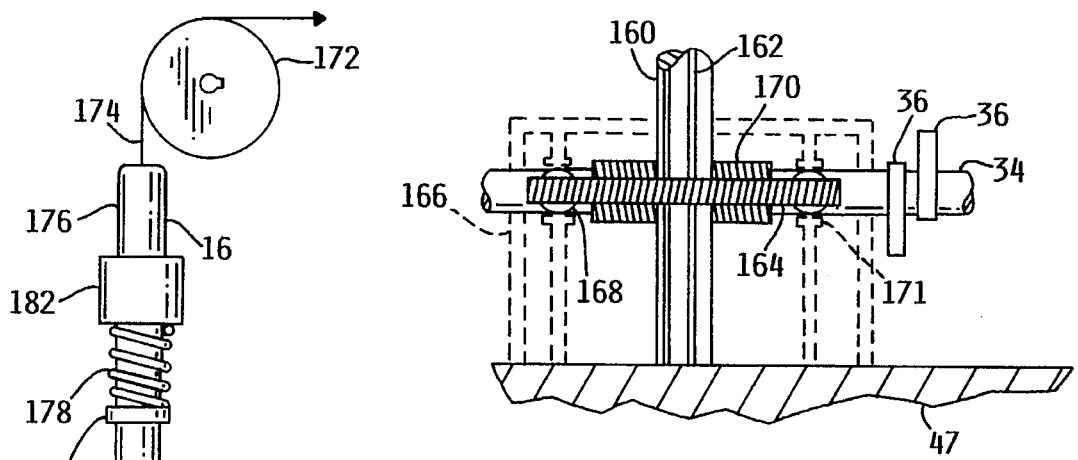
FIG. 7 shows another embodiment for transmitting rotational power to the shaft of the disk of the fluid feed mechanism while permitting axial movement of the shaft relative to the means for transmitting rotational power.

It can be appreciated that FIG. 7 shows an alternate embodiment of the invention to permit rotation and linear movement of the timing adjustment shaft. In such an arrangement, the timing adjustment shaft 160 is splined so as to include axially extending splines 162. A disk shaped gear 164 having corresponding splines mates with the shaft 160 such that the shaft 160 is movable axially and such that the gear 164 transmits rotational movement to the timing adjustment shaft 160. The gear 164 is mounted in a housing or gear box 166 having bearings 168 engaged with both faces of the gear 164 to support the gear 164. The gear 164 is driven by a worm 170 fixed to and rotating with the camshaft 34. Annular races 171 may be fixed in the box 166.

Figure 8:
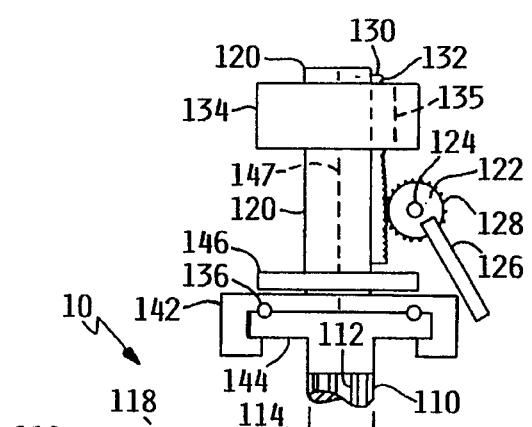
FIG. 8 shows another embodiment for transmitting axial movement to the shaft for timing the disk.

It can be appreciated that FIG. 8 shows an alternate embodiment for moving the timing adjustment shaft 16 in the axial direction. Such an arrangement includes a hand or electrically driven gear or pulley 172 having a chain or line 174 engaged with the timing adjustment shaft portion 176 to urge the shaft portion 176 in one direction. A coil spring 178 urges the shaft portion in the other direction. The coil spring 178 is mounted on the shaft portion 176 between an annular stop 180 fixed to the shaft portion 176 and a bushing 182 fixed relative to the engine 18 such as to the engine head 47.

It can further be appreciated that the rotating injector structure, preferably in the shape of a disk, may be formed in other shapes. For example, such a rotating injector structure may take the form of a sphere, or half-sphere, or may be frustoconical in shape. It is preferred that the rotating injector structure include a generally flat face or portion, from which the fluid cavity extends inwardly into the structure, for permitting fluid communication at the upper or outer generally flat end of the combustion cylinder, and another face or portion for permitting rotation in the engine head or block.

It can further be appreciated that the rotating structure 12 may be mounted in the engine head or block. It can further be appreciated that fluid lines may be introduced to the rotating structure 12 through the engine head or block.

It can further be appreciated that the pressure in the combustion cylinder 60 is preferably higher than the pressure in the fluid filled cavity 14. In such a case, the cavity 14 acts as a stratified charge chamber, with the compressed fluid in the combustion cylinder 60 flowing into the cavity 14 and mixing with the fluid in the cavity 14 for combustion.

Advantageously, the disk 12 may be timed so as to correspond to the degree of mixing desired. In the case of gaseous fluid, such mixing is almost instantaneous. Still further, the disk 12 may be timed according to the kinds of fluids exposed to the cylinder 60 by the cavity 14 and the intake 50.

It can further be appreciated that the timing adjustment shaft 16 may be driven by means other than an overhead camshaft. For example, chains may be connected from the camshaft mounted in a lower portion of the engine, in which case push rods are utilized to open and close the valves. Still further, chains may be connected to the shaft 16 from the crankshaft. In any case, it is preferred that a mechanical train running from the piston 20 drives the shaft 16.

It can further be appreciated that more than one disk may be provided for each cylinder, that the size and width of the disk is variable, that the disk may rotate faster for a two stroke engine, and that more than one fluid cavity 14 may be formed in the disk.

It can be appreciated that the present invention includes a method for exposing a fluid to the combustion chamber of an internal combustion engine, with the method including the steps of providing a structure with a cavity formed therein, with the structure being mounted on the engine, and with the cavity communicable with the fluid outlet and the combustion chamber; then introducing fluid from the fluid outlet to the cavity; then rotating the structure such that the cavity rotates from the fluid outlet to the combustion chamber; then permitting the fluid in the cavity to mix with other fluid in the combustion chamber and permitting such other fluid to have entered the combustion chamber from the intake valve; and then combusting the mixed fluid in the combustion chamber or cavity and rotating the structure such that the cavity rotates from the combustion chamber to the fluid outlet. The steps of rotating the structure may include the step of rotating the structure in one direction. The step of rotating the structure in one direction may further include the step of retarding the location of the cavity relative to the piston stroke or the step of advancing the location of the cavity relative to the piston stroke. The method may further include the step of purging the cavity during the step of rotating the structure such that the cavity rotates from the combustion chamber to the fluid outlet, with the step of evacuating the cavity occurring after the cavity has communicated with the combustion chamber and prior to the cavity communicating with the fluid outlet.

It can be appreciated that the reference character A generally designates means for moving the timing adjustment shaft in the axial direction. The reference character B generally designates means for transmitting axial movement without transmitting rotational movement. This means B includes a seal for containing oil within the thrust bearing 136, the shaft portion 110, and disk 12, which otherwise may work its way into means A. The seal also prevents exterior dirt from contaminating the oil of the thrust bearing 136, shaft portion 110, and disk 12. The reference character C generally designates means for rotating the timing adjustment shaft and the injector disk while permitting axial movement of the timing adjustment shaft.

It may further be appreciated that the disk 12 may be counter-balanced by forming another cavity diametrically opposite of cavity 14. Such a cavity may then be sealed relative to the upper and lower surfaces 64 and 66.

It can further be appreciated that the disk 12 may be related via a computer to the stroke of the piston. In such a case, one sensor is preferably placed in or on the peripheral region of the disk 12 and the other sensor in the peripheral region of the disk seat or such adjacent region of the head.

Preferably, the sensor in or on the disk travels through the combustion chamber during the exhaust or intake strokes to minimize heat and pressure forces on the sensor in the disk. If desired, sensors may be placed in other areas, such as in the shaft or in the block. The sensors communicate with the computer and with each other such as by magnetic pulses. However, it should be noted that a mechanical train is preferred.

It can further be appreciated that the cavity 14 may be coated or lined. Such a coating may include a reactive coating such as a catalyst to enhance combustion and increase the number of combustible fluids suitable for use, or include a protective coating such as a metal or chemical coating to minimize thermal stress from combustion on the disk or especially on the portion of the disk forming the cavity. For example, in the case of the combustible fluid being hydrogen, the preferred coating is a durable material which withstands extreme thermal stresses.

It can be further appreciated that the angled splined shaft gear arrangement may be modified to be the equivalent of an Egbert type arrangement. An Egbert type arrangement according to the present invention is an oval spiraled shaft, replacing shaft portion 102, traversing in an oval spiraled aperture, replacing opening 70, formed in the center of the disk 12.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A fluid feed mechanism for introducing a first fluid into a combustion chamber formed in a block of an internal combustion engine, the fluid feed mechanism comprising: a rotatable structure with a pocket formed therein, the structure being rotatably mounted in the engine adjacent to the combustion chamber, with the pocket having a fluid inlet with a width; first fluid introduction means for introducing the first fluid into the pocket and having a first fluid outlet, with the fluid being introduced from the first fluid outlet and into the fluid inlet of the pocket, the first fluid outlet being spaced from the combustion chamber by a portion of the block, with the portion of the block having a width greater than the width of the fluid inlet of the pocket such that the block portion shuts off the pocket when the pocket is rotated from the first fluid outlet and seals the fluid in the pocket until the fluid inlet of the pocket begins to communicate with the combustion chamber, the pocket being communicable with the first fluid outlet and with the combustion chamber at different times; and means for rotating the structure, the structure further being rotatably mounted in the engine adjacent to the first fluid outlet such that, as the structure rotates, the pocket rotates between the first fluid outlet and the combustion chamber such that fluid is flowable out of the fluid inlet of the pocket to the combustion chamber.

2. The fluid feed mechanism of claim 1 and the structure having a pair of end surfaces spaced apart from each other in the axial direction, one of the surfaces being generally flat, wherein the fluid inlet of the pocket opens from the generally flat end surface.

3. The fluid feed mechanism of claim 2 and the structure comprising the shape of a disk.

4. The fluid feed mechanism of claim 1 and the combustion chamber having an opening for communicating with the structure with the opening being defined at least in part by an edge, wherein the fluid inlet of the pocket is formed at least in part by a leading edge, the edges being substantially equidistant from each other at one location as the structure rotates whereby, as the pocket begins to communicate with the combustion chamber, fluid flow is maximized between the pocket and the combustion chamber.

5. The fluid feed mechanism of claim 1 wherein the fluid inlet of the pocket is formed at least in part by a leading edge, with the leading edge being convex.

6. The fluid feed mechanism of claim 1 wherein the fluid inlet of the pocket is formed at least in part by a trailing edge, with the trailing edge being convex.

7. The fluid feed mechanism of claim 1 and the chamber having a piston, further comprising a mechanical train running from the piston to the structure.

8. The fluid feed mechanism of claim 1 and the chamber having a piston, further comprising timing means on the structure for timing the structure relative to the piston whereby fluid is exposed to the chamber at the desired position of the stroke of the piston.

9. The fluid feed mechanism of claim 8 wherein the timing means includes a shaft for rotating the structure relative to the piston, and alignment means on the shaft for rotating the structure relative to the shaft to enable timing of the structure relative to the stroke of the piston.

10. The fluid feed mechanism of claim 9 wherein the alignment means comprises an angled splined gear arrangement formed between the shaft and the structure.

11. The fluid feed mechanism of claim 10 wherein the alignment means further comprises means for moving the shaft in the axial direction for rotating the structure relative to the shaft by the angled splined gear arrangement.

12. The fluid feed mechanism of claim 1 and the internal combustion engine having an engine block portion and a head portion, and the first fluid outlet being formed in one of the portions, wherein the first fluid introduction means comprises a first fluid line under pressure and formed in the portion having the first fluid outlet, the first fluid line communicating with the first fluid outlet.

13. The fluid feed mechanism of claim 12 wherein the first fluid line includes means for maintaining the pressure of the first fluid in the pocket when the pocket is in communication with the first fluid line.

14. The fluid feed mechanism of claim 13 wherein the means for maintaining the pressure comprises a one way valve.

15. The fluid feed mechanism of claim 1 and further comprising second fluid introduction means for introducing a second fluid into the pocket as the pocket rotates between the combustion chamber and the fluid outlet.

16. The fluid feed mechanism of claim 15 and the internal combustion engine having an engine block portion and a head portion, wherein the second fluid introduction means comprises a second fluid line under pressure and formed in one of the portions.

17. The fluid feed mechanism of claim 16 wherein the second fluid line includes a length and a divider running the length of the second fluid line to divide the line into two line sections, one of the sections being under pressure such that the second fluid is conveyed into and out of the pocket to clean the pocket.

18. The fluid feed mechanism of claim 1 wherein the fluid comprises a combustible gas.

19. The fluid feed mechanism of claim 1 and the internal combustion engine having an intake valve communicating with the combustion chamber, wherein the pocket is communicable with the combustion chamber relative to the opening and closing of the intake valve such that the first fluid is mixable with another fluid entering the combustion chamber through the intake valve.

20. The fluid feed mechanism of claim 1 wherein the disk is counter-balanced to compensate for the pocket.

21. The fluid feed mechanism of claim 1 and the combustion chamber having a chamber sidewall and a piston reciprocating therein, with the piston having at least one compression ring and a piston sidewall, further comprising a disk seat for the disk, the disk seat fixed relative to the engine and having a lip extending from the chamber sidewall to and at least partially beyond the piston sidewall to protect the compression ring and cylinder wall during combustion.

22. The fluid feed mechanism of claim 1 wherein the rotatable structure further comprises a coating on surfaces forming the pocket.

23. A fluid feed mechanism for introducing a fluid into a combustion chamber of an internal combustion engine, the engine having a piston in the chamber, a block portion and a head portion, the fluid feed mechanism comprising:

(a) a rotatable disk rotating in a disk seat formed in one of the portions, the disk having a circular side surface and a pair of generally flat and parallel end surfaces spaced apart in the axial direction, the disk having a cavity extending in from one of the flat end surfaces and spaced from the side surface;

(b) a fluid line formed in one of the portions for introducing the fluid into the cavity and having a fluid line outlet, the cavity being communicable with the fluid line outlet and the combustion chamber; and (c) power and timing means engaged with the disk for rotating the disk such that, as the disk rotates, the cavity rotates between the fluid line outlet and the combustion chamber to permit the fluid from the fluid line outlet to communicate with the combustion chamber, the power and timing means comprising:

(i) a shaft engaged centrally with the disk;

(ii) a mechanical power train running from the piston to the shaft and including rotation transmitting means engaged with the shaft for rotating the shaft and the disk, the rotation transmitting means permitting axial movement of the shaft while transmitting rotational movement to the shaft; and (iii) timing adjustment means for rotating the shaft relative to the disk, the timing adjustment means comprising an angled splined gear arrangement between the disc and the shaft such that axial movement of the shaft rotates the disk relative to the shaft, the timing adjustment means further comprising means for transmitting axial movement to the shaft to rotate the disk relative to the shaft.

24. A method for exposing a fluid to a combustion chamber formed in a block of an engine which includes a fluid line having a fluid line outlet, the method comprising the steps of:

(a) providing a structure with a pocket formed therein, the structure being mounted on the engine, the pocket communicable with the fluid outlet and the combustion chamber at different times; then (b) introducing fluid from the fluid outlet directly to the pocket; then (c) rotating the structure such that the pocket rotates from the fluid outlet to the combustion chamber and such that a portion of the block seals the pocket; then (d) permitting the pocket to communicate directly with the combustion chamber to permit fluid in the pocket to mix with fluid in the chamber; and (e) combusting the fluid which has mixed and rotating the structure such that the pocket rotates from the combustion chamber to the fluid outlet.

25. The method of claim 24 wherein the steps of rotating the structure comprises the step of rotating the structure in one direction.

26. The method of claim 25 and the combustion chamber having a piston, wherein the step of rotating the structure in one direction further comprises the step of retarding the location of the pocket relative to the stroke of the piston.

27. The method of claim 25 and the combustion chamber having a piston, wherein the step of rotating the structure in one direction further comprises the step of advancing the location of the pocket relative to the stroke of the piston.

28. The method of claim 24 further comprising the step of purging the pocket during the step of rotating the structure such that the pocket rotates from the combustion chamber to the fluid outlet, the step of purging the pocket occurring after the pocket has communicated with the combustion chamber and prior to the pocket communicating with the fluid outlet.

* * * * *